(12) United States Patent
Kim

(10) Patent No.: US 12,555,469 B2
(45) Date of Patent: Feb. 17, 2026

(54) APPARATUS FOR PREDICTING TRAFFIC INFORMATION AND METHOD FOR THE SAME

(71) Applicants: HYUNDAI MOTOR COMPANY, Seoul (KR); KIA CORPORATION, Seoul (KR)

(72) Inventor: Tae Heon Kim, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 860 days.

(21) Appl. No.: 17/715,604

(22) Filed: Apr. 7, 2022

(65) Prior Publication Data

US 2023/0099044 A1 Mar. 30, 2023

(30) Foreign Application Priority Data

Sep. 28, 2021 (KR) ........................ 10-2021-0128195

(51) Int. Cl.
*G08G 1/01* (2006.01)
*G06F 18/23213* (2023.01)
(52) U.S. Cl.
CPC ..... *G08G 1/0133* (2013.01); *G06F 18/23213* (2023.01); *G08G 1/0116* (2013.01); *G08G 1/0129* (2013.01)

(58) Field of Classification Search
CPC .. G08G 1/0133; G08G 1/0116; G08G 1/0129; G06F 18/23213
See application file for complete search history.

(56) References Cited

FOREIGN PATENT DOCUMENTS

KR 102197195 B1 1/2021

OTHER PUBLICATIONS

Kmeans, Learn by Marketing, https://www.learnbymarketing.com/tutorials/k-means-clustering-by-hand-excel/ (Year: 2016).*
Montazeri, Traffic condition recognition using the-means clustering method, https://www.sciencedirect.com/science/article/pii/S1026309811001180 (Year: 2010).*

* cited by examiner

*Primary Examiner* — Aryan E Weisenfeld
(74) *Attorney, Agent, or Firm* — Lempia Summerfield Katz LLC

(57) ABSTRACT

An apparatus and a method for predicting traffic information are provided. The apparatus includes a storage to store a model for correcting traffic information for each traffic state in a road section, and a controller that determines the traffic state in the road section to be predicted based on K-means clustering algorithm, obtains a correcting value by using a model for correcting traffic information corresponding to the traffic state in the road section to be predicted, and corrects traffic information based on the obtained correcting value to predict real-time traffic information with higher accuracy.

12 Claims, 5 Drawing Sheets

APPARATUS FOR PREDICTING TRAFFIC INFORMATION AND METHOD FOR THE SAME

CROSS-REFERENCE TO RELATED APPLICATION

This application claims the benefit of and priority to Korean Patent Application No. 10-2021-0128195, filed in the Korean Intellectual Property Office on Sep. 28, 2021, the entire contents of which are incorporated herein by reference.

FIELD

The present disclosure relates to a technology of predicting traffic information using a model with respect to which machine learning has been finished.

BACKGROUND

The statements in this section merely provide background information related to the present disclosure and may not constitute prior art.

Traffic information, which is currently provided, corresponds to information predicted based on a previous speed pattern. In other words, the traffic information, that is, speed information, which is currently provided, has been derived from the previous speed pattern, on the assumption that a similar speed pattern is made for the same period of time of day.

When utilizing traffic information for the same period of time on the same day in the past, for example, when utilizing the speed pattern on Monday, February 3rd 9:00 a.m.-9:05 a.m., and the speed pattern Monday, February 10th 9:00 a.m.-9:05 a.m. the speed pattern Monday, March 2nd from 9:00 a.m. to 9:05 a.m. is predicted.

However, according to a manner of predicting the speed based on the past speed pattern, exceptional characteristics, which may be shown at a relevant time point, for example, parameters, such as weather or seasons, may be variously changed, and a traffic volume may vary by season. Accordingly, incorrect data may be utilized to predict the speed. In other words, the assumption that a similar speed is maintained for the same period of time may increase the probability of causing an error in predicting the traffic information.

Meanwhile, studies and researches have been performed on whether the change in the traveling amount of a probe vehicle (hereinafter, a probe) exerts an influence on traffic. In this case, although a traffic congestion time may be predicted macroscopically based on the time point of GPS occurrence, there is a limit in microscopically predicting the speed in the unit of a link (a road to be predicted) for each time period, due to the limited number of probe samples.

According to a conventional technology of predicting traffic information, GPS position information is periodically received from a plurality of probe vehicles traveling on a road section (hereinafter, a predicting section) to be predicted in traffic information, the speeds of the plurality of probe vehicles passing through a predicting section is calculated, based on the GPS position information of the plurality of probe vehicles, the representative speed of the probe vehicles in the predicting section is calculated based on the calculated speeds of the probe vehicles passing through a predicting section, and the calculated representative speed is provided, as real-time traffic information, to a user. In this case, the speed (kph) for passing through the predicting section is a result value obtained by dividing the whole distance of the predicting section by a time (predicting section passing time) taken to pass through the predicting section.

According to the conventional technology of predicting traffic information, since the representative speed in the past is provided, as current real-time traffic information, to the user without any correction, the accuracy of the real-time traffic information is significantly degraded.

The matter described in "Background" is made for the convenience of explanation, and may include matters other than a related art well known to those having ordinary skill in the art.

SUMMARY

The present disclosure has been made to solve the above-mentioned problems occurring in the prior art while advantages achieved by the prior art are maintained intact.

An aspect of the present disclosure provides an apparatus for predicting traffic information and a method for the same, capable of predicting real-time traffic information with higher accuracy by having a model for correcting traffic information for each traffic state in a road section, determining the traffic state in a road section (predicting section) to be predicted, based on K-means clustering algorithm, obtaining a correcting value by using the model for correcting the traffic information corresponding to the traffic state in the road section to be predicted, and correcting the traffic information, based on the obtained correcting value.

The technical problems to be solved by the present disclosure are not limited to the aforementioned problems, and any other technical problems not mentioned herein should be clearly understood from the following description by those having ordinary skill in the art to which the present disclosure pertains.

According to an embodiment of the present disclosure, an apparatus for predicting traffic information may include: a storage to store a model for correcting traffic information for each traffic state in a road section, and a controller to determine the traffic state in a road section (a predicting section) to be predicted, based on K-means clustering algorithm, obtains a correcting value by using a model for correcting traffic information corresponding to the traffic state in the road section to be predicted, and corrects traffic information based on the obtained correcting value.

According to an embodiment of the present disclosure, the controller may classify the traffic state in the predicting section into one of a traffic-stability maintained state, an added congestion state, and a smoothly recovered traffic state by using speeds of a plurality of probe vehicles passing through the predicting section, and a representative speed in the predicting section.

According to an embodiment of the present disclosure, the controller may correct the representative speed in the predicting section, based on the correcting value which is obtained.

According to an embodiment of the present disclosure, the controller may decrease the representative speed in the predicting section, in the added congestion state.

According to an embodiment of the present disclosure, the controller may increase the representative speed in the predicting section, in the smoothly recovered traffic state, and may decrease the representative speed in the predicting section for a reference time thereafter.

According to an embodiment of the present disclosure, the controller may calculate speeds of a plurality of probe vehicles passing through the predicting section, based on position information periodically received from the plurality of probe vehicles.

According to an embodiment of the present disclosure, the controller may calculate, as the representative speed in the predicting section, a mean value of the speeds of the plurality of probe vehicles passing through the predicting section.

According to an embodiment of the present disclosure, a method for predicting traffic information may include storing, by a storage, a model for correcting traffic information for each traffic state in a road section, and determining, by a controller, the traffic state in the road section to be predicted, based on K-means clustering algorithm, obtaining, by the controller, a correcting value by using a model for correcting traffic information corresponding to the traffic state in the road section to be predicted, and correcting, by the controller, traffic information based on the obtained correcting value.

According to an embodiment of the present disclosure, the method may include classifying the traffic state of the predicting section into one of a traffic-stability maintained state, an added congestion state, and a smoothly recovered traffic state by using speeds of a plurality of probe vehicles passing through the predicting section, and a representative speed in the predicting section.

According to an embodiment of the present disclosure, the method may include correcting the representative speed in the predicting section, based on the correcting value which is obtained.

According to an embodiment of the present disclosure, the method may include decreasing the representative speed in the predicting section, in the added congestion state.

According to an embodiment of the present disclosure, the method may include increasing the representative speed in the predicting section, in the smoothly recovered traffic state, and decreasing the representative speed in the predicting section for a reference time thereafter.

According to an embodiment of the present disclosure, the method may include calculating speeds of a plurality of probe vehicles passing through the predicting section, based on position information periodically received from the plurality of probe vehicles.

According to an embodiment of the present disclosure, the method may include calculating, as the representative speed in the predicting section, a mean value of the speeds of the plurality of probe vehicles passing through the predicting section.

BRIEF DESCRIPTION OF THE DRAWINGS

The above and other objects, features and advantages of the present disclosure should be more apparent from the following detailed description taken in conjunction with the accompanying drawings.

Figure 1:
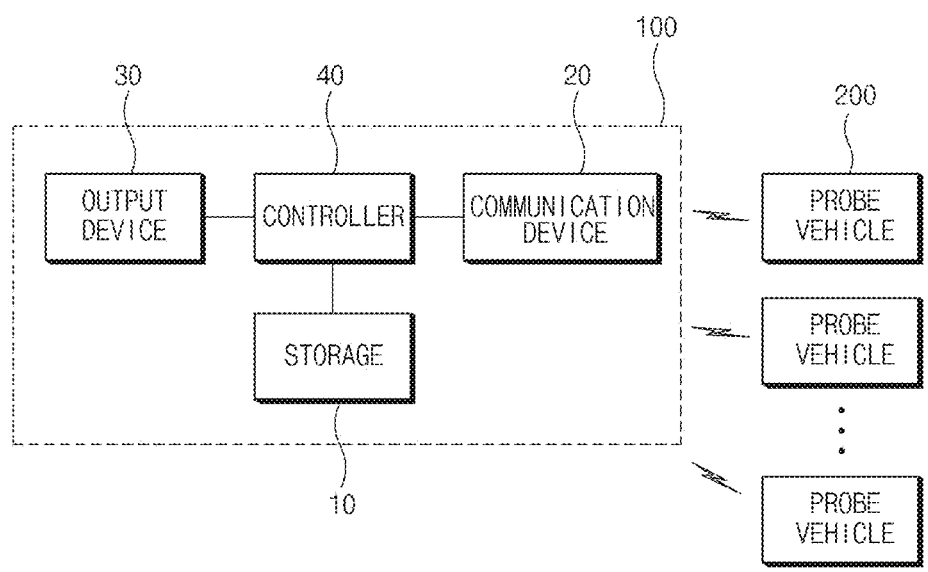
FIG. 1 is a view illustrating an apparatus of predicting traffic information, according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Also, the terms, such as 'unit' or 'module', etc., should be understood as a unit that processes at least one function or operation and that may be embodied in a hardware manner (e.g., a processor), a software manner, or a combination of the hardware manner and the software manner.

FIG. 1 is a view illustrating a configuration of predicting traffic information, according to an embodiment of the present disclosure.

As illustrated in FIG. 1, according to an embodiment of the present disclosure, an apparatus 100 for predicting traffic information may include a storage 10, a communication device 20, an output device 30, and a controller 40. In this case, according to an embodiment of the present disclosure, components may be combined into each other to be implemented in one form, or some components may be omitted, depending on manners of reproducing the apparatus 100 for predicting traffic information.

Regarding the components, the storage 10 may store a model (correcting model) for correcting traffic information for each traffic state in a road section. In this case, the traffic state for the road section may indicate a traffic state, such as a traffic-stability maintained state, an added congestion state, or a smoothly recovered traffic state, to a future time point (for example, in 10 minutes), instead of merely indicating only a traffic state, such as a smooth traffic state, a slow traffic state, or a traffic congestion state, at a current time point.

The storage 10 may store a program and a set of instructions that implement an algorithm. In one form, the storage 10 may store a set of instruction that implement K-means clustering algorithm for determining the traffic state in a predicting section by using speeds of a plurality of probe vehicles 200 passing through the predicting section, and a representative speed in the predicting section.

The storage 10 may store various logic, algorithms and programs required in the procedure of determining the traffic state in the road section to be predicted, based on K-means clustering algorithm, obtaining a correcting value by using a model (traffic information correcting model) for correcting traffic information corresponding to the traffic state in the road section to be predicted, and correcting traffic information (e.g., the representative speed of the predicting section) based on the obtained correcting value.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The communication device 20 is a module that provides a communication interface with the plurality of probe vehicles 200 traveling on a road, and may periodically receive probe data from the plurality of probe vehicles 200. In this case, each probe vehicle 200 may include a Telematics terminal serving as a vehicle terminal. In addition, the probe data may include identification information (ID), and GPS position information.

The communication device 20 may include at least one of a mobile communication module, a wireless Internet module, and a short-range communication module to communicate with the plurality of probe vehicles 200.

The mobile communication module may make communication with the plurality of probe vehicles 200 over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTEA), 4th Generation mobile telecommunication (4G), or 5th Generation mobile telecommunication (5G).

The wireless Internet module, which is a module for wireless Internet access, may make communication with the plurality of probe vehicles 200 through Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The output device 30 may output the traffic information (the speed for passing through the predicting section) corrected by the controller 40.

The controller 40 may perform the overall control such that the components normally perform the respective functions. In addition, the controller 40 may be implemented in the form of hardware or software, and may be implemented in the form of the combination of the hardware and the software. In one form, the controller 40 may be implemented with a micro-processor, but the present disclosure is not limited thereto.

The storage 40 may store various logic, a set of instructions that implement algorithms, and programs, which are required in the procedure of determining the traffic state in the road section to be predicted, based on K-means clustering algorithm, obtaining a correcting value by using a model (traffic information correcting model) for correcting traffic information corresponding to the traffic state in the road section to be predicted, and correcting traffic information (e.g., the representative speed of the predicting section) based on the obtained correcting value.

Figure 3:
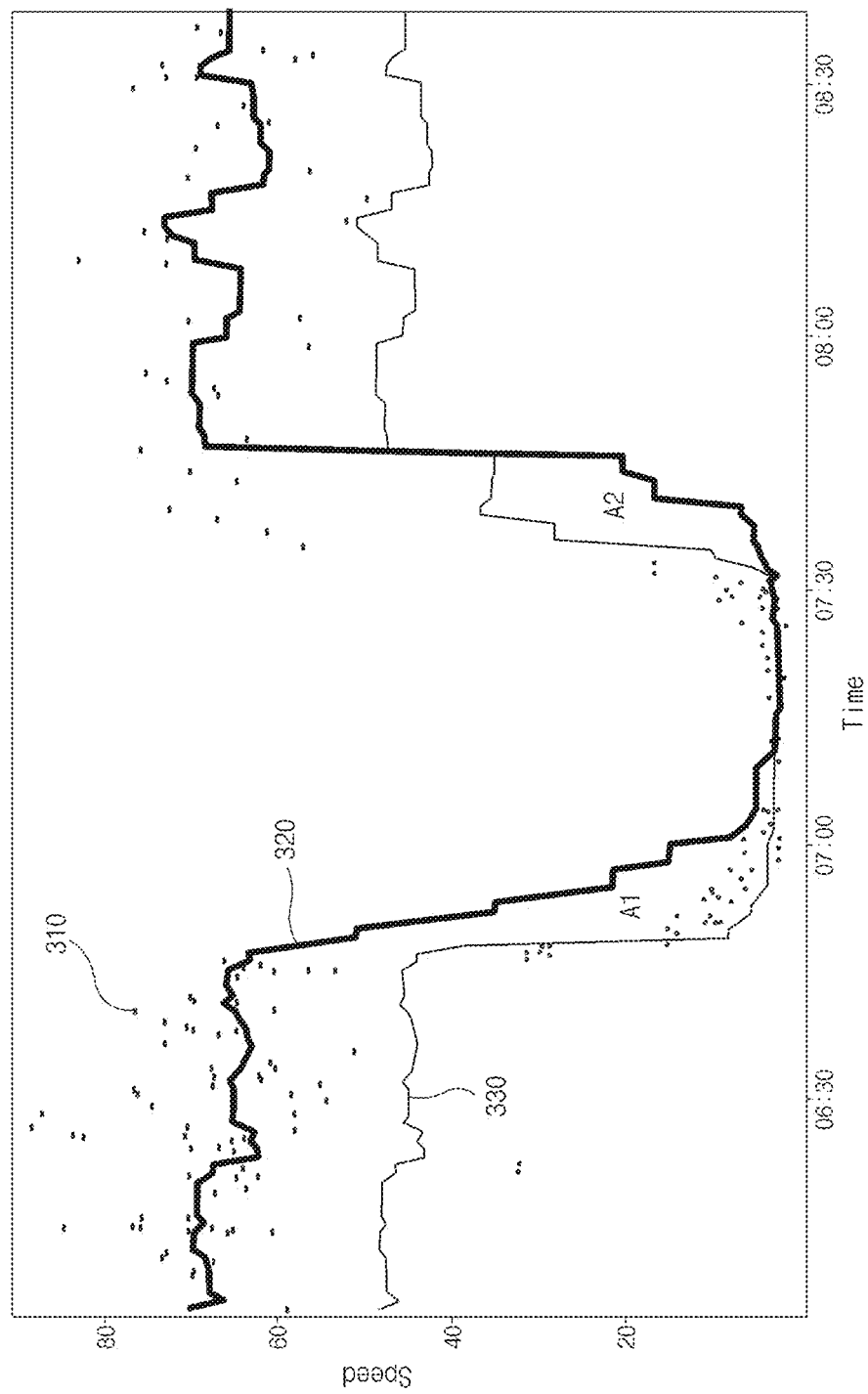
FIG. 3 is a view illustrating a result by correcting traffic information by a controller provided in an apparatus for predicting traffic information, according to an embodiment of the present disclosure.

The controller 40 may classify the traffic state of the predicting section into any one of a traffic-stability maintained state, an added congestion state, and a smoothly recovered traffic state by using speeds of a plurality of probe vehicles 200 passing through the predicting section, and a representative speed in the predicting section, through the k-mean clustering algorithm. For example, an added congestion state 'A1' and a smoothly recovered traffic state 'A2', which are classified by the controller 40, are illustrated in FIG. 3. In this case, the representative speed in the predicting section may be calculated as the mean value of the speeds of the plurality of probe vehicles 200 passing through the predicting section, but the present disclosure is not limited thereto.

For reference, K-means clustering algorithm is to group given data into k clusters, and to minimize the distribution of distance differences between the clusters. K-means clustering algorithm is a kind of unsupervised learning algorithm to label input data which is unlabeled. K-means clustering algorithm has the structure similar to that of a clustering manner using an expectation-maximization algorithm.

Hereinafter, the operation of the controller 40 is described in detail with reference to FIGS. 2 and 3.

Figure 2:
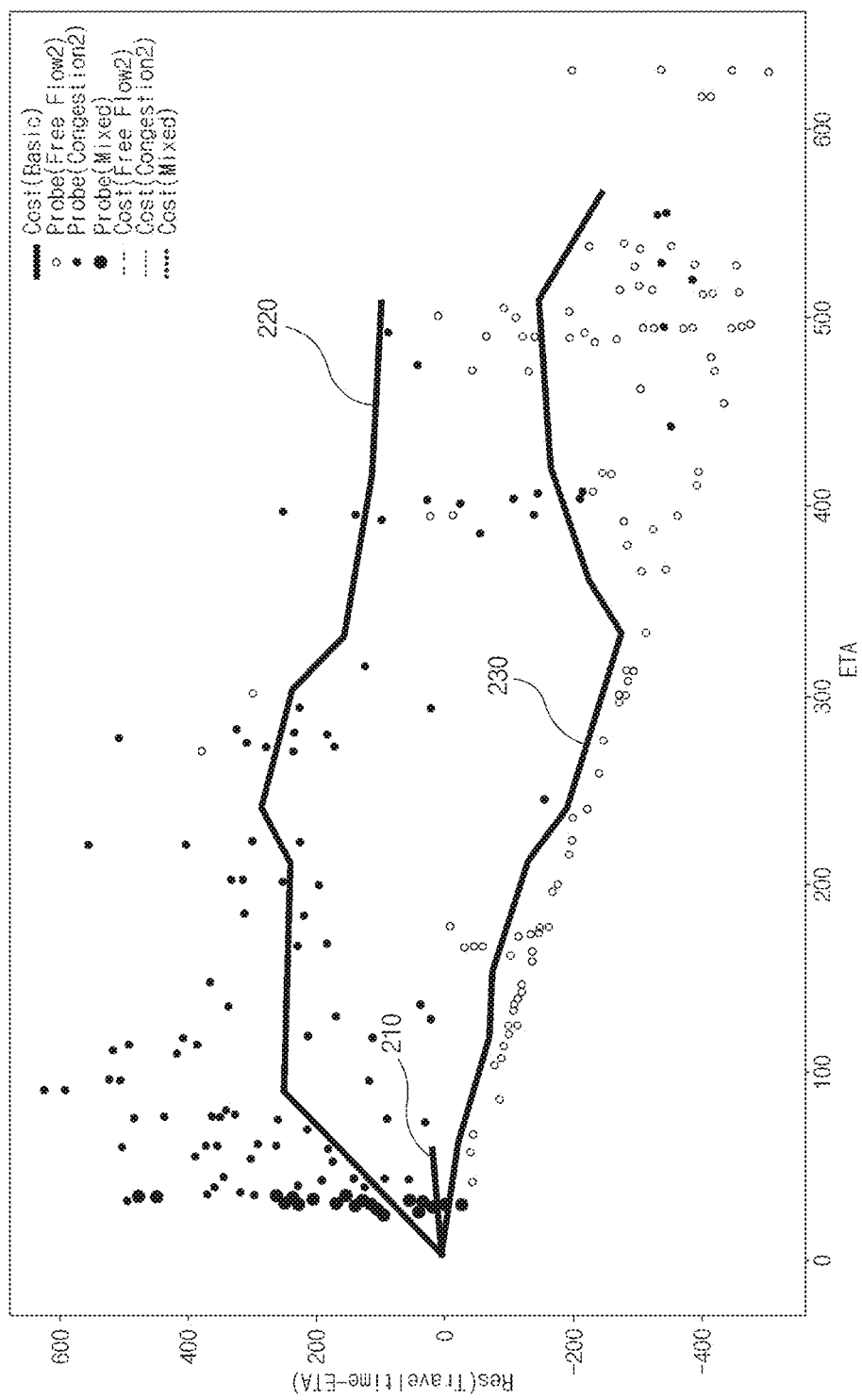
FIG. 2 is a view illustrating a correcting value calculated using a traffic information correcting module corresponding to a traffic state of a predicting section, by a controller provided in an apparatus for predicting traffic information, according to an embodiment of the present disclosure.

FIG. 2 is a view illustrating a correcting value calculated using a traffic information correcting module corresponding to a traffic state of a predicting section, by a controller provided in an apparatus for predicting traffic information, according to an embodiment of the present disclosure.

As illustrated in FIG. 2, reference numeral '210' indicates a correcting value obtained by the controller 40 when the traffic state of the predicting section is the traffic-stability maintained state, reference numeral '220' indicates a correcting value obtained by the controller 40, when the traffic state of the predicting section is the added congestion state, and reference numeral '230' indicates a correcting value obtained by the controller 40, when the traffic state of the predicting section is the smoothly recovered traffic state. In this case, a y axis indicates 'RES', and an x axis indicates an estimated time of arrival (ETA).

The traffic information correcting module corresponding to the traffic state in the predicting section may be implemented, for example, 'Decision Tree'. A value obtained by changing the representative speed in the predicting section in terms of time, the traffic state, and the 'RES' may be employed as input parameters, a correcting value (for example, the corrected RES) may be employed as an output parameter, an objective function may be set as a room mean square error (RMSE), and a validation manner may be set as a cross-validation (k:10). In this case, 'Res' indicates a value obtained by subtracting a time taken for the probe vehicle 200 to pass through the predicting section from the representative time in the predicting section. In this case, the representative time in the predicting section is a value obtained by dividing the distance of the predicting section by the representative speed, and the time taken for the probe vehicle 200 to pass through the predicting section indicates a value obtained by dividing the distance of the predicting section by the speed of the probe vehicle passing through the predicting section.

FIG. 3 is a view illustrating a result by correcting traffic information by a controller provided in an apparatus for predicting traffic information, according to an embodiment of the present disclosure.

In FIG. 3, reference numeral 310 indicates the speed of the probe vehicle 200 passing through the predicting section, reference numeral 320 indicates the representative speed in the predicting section, and reference numeral 330 indicates a result obtained by correcting the representative speed in the predicting section. In addition, reference numeral 'A1' indicates an area in which the traffic state of the predicting section is the added congestion state, and reference numeral 'A2' indicates an area in which the traffic state of the predicting section is the smoothly recovered traffic state.

The controller 40 corrects the representative speed in the predicting section, based on the correcting value corresponding to the added congestion state in an area of 'A1'. In other words, the controller 40 lowers a representative speed 320 in the predicting section of the area of 'A1'. For example, as illustrated in FIG. 3, although the representative speed in the predicting section on 6:50 a.m. is 41 km/h, the speed in the predicting section, which is corrected by the controller 40, becomes 7 km/h.

The controller 40 corrects the representative speed of the predicting section based on a correcting value corresponding to an added congestion state in an area of 'A2'. In other words, the controller increases the representative speed 320 in the predicting section of the area 'A2', and decreases the representative speed 320 in the predicting section for a specific time from after the area of 'A2'. For example, as illustrated in FIG. 3, the speed 330 in the predicting section, which is corrected by the controller 40, becomes greater than the representative speed 320 in the predicting section from 7:34. Thereafter, from 7:45 which is a time point at which the representative speed 320 is sharply increased, although the representative speed 320 in the predicting section becomes approximately 70 km/h, the speed 330 in the predicting section, which is corrected by the controller 40, becomes approximately 50 km/h.

Figure 4:
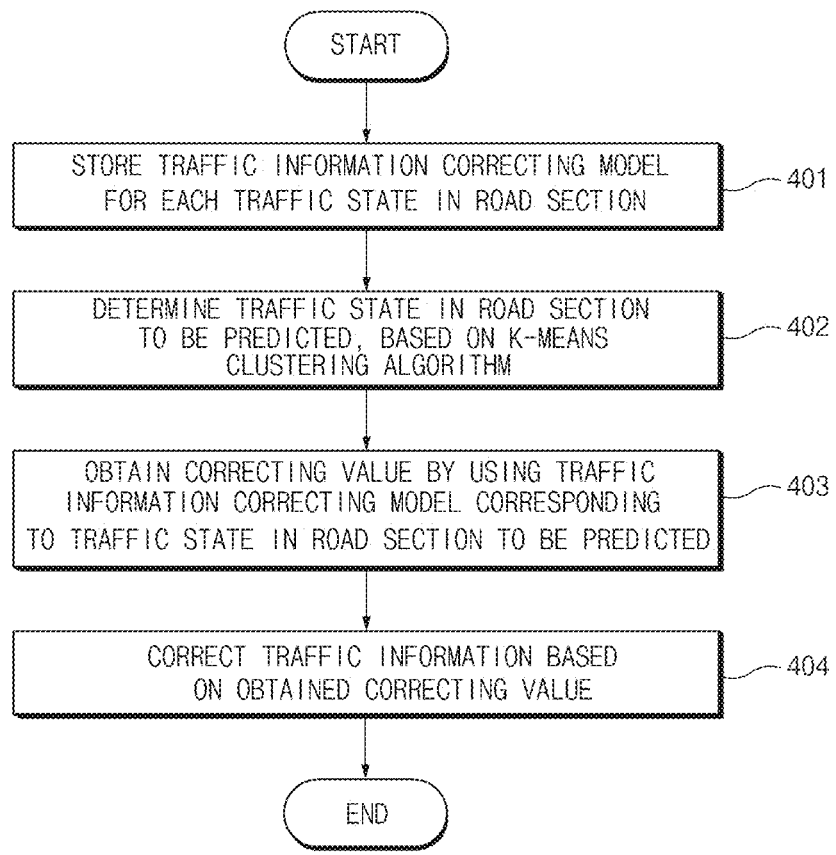
FIG. 4 is a flowchart illustrating a method of predicting traffic information, according to an embodiment of the present disclosure.

FIG. 4 is a view illustrating a configuration of predicting traffic information, according to an embodiment of the present disclosure.

First, the storage 10 stores the traffic information correcting model for each traffic state in a road section (401).

Thereafter, the controller 40 determines the traffic state in a road section to be predicted (i.e., a predicting section) based on K-means clustering algorithm (402).

Thereafter, the controller 40 obtains a correcting value by using the traffic information correcting model corresponding to the traffic state in the road section to be predicted (403).

Thereafter, the controller 40 corrects traffic information (for example, the representative speed of the predicting section) based on the obtained correcting value (404).

Figure 5:
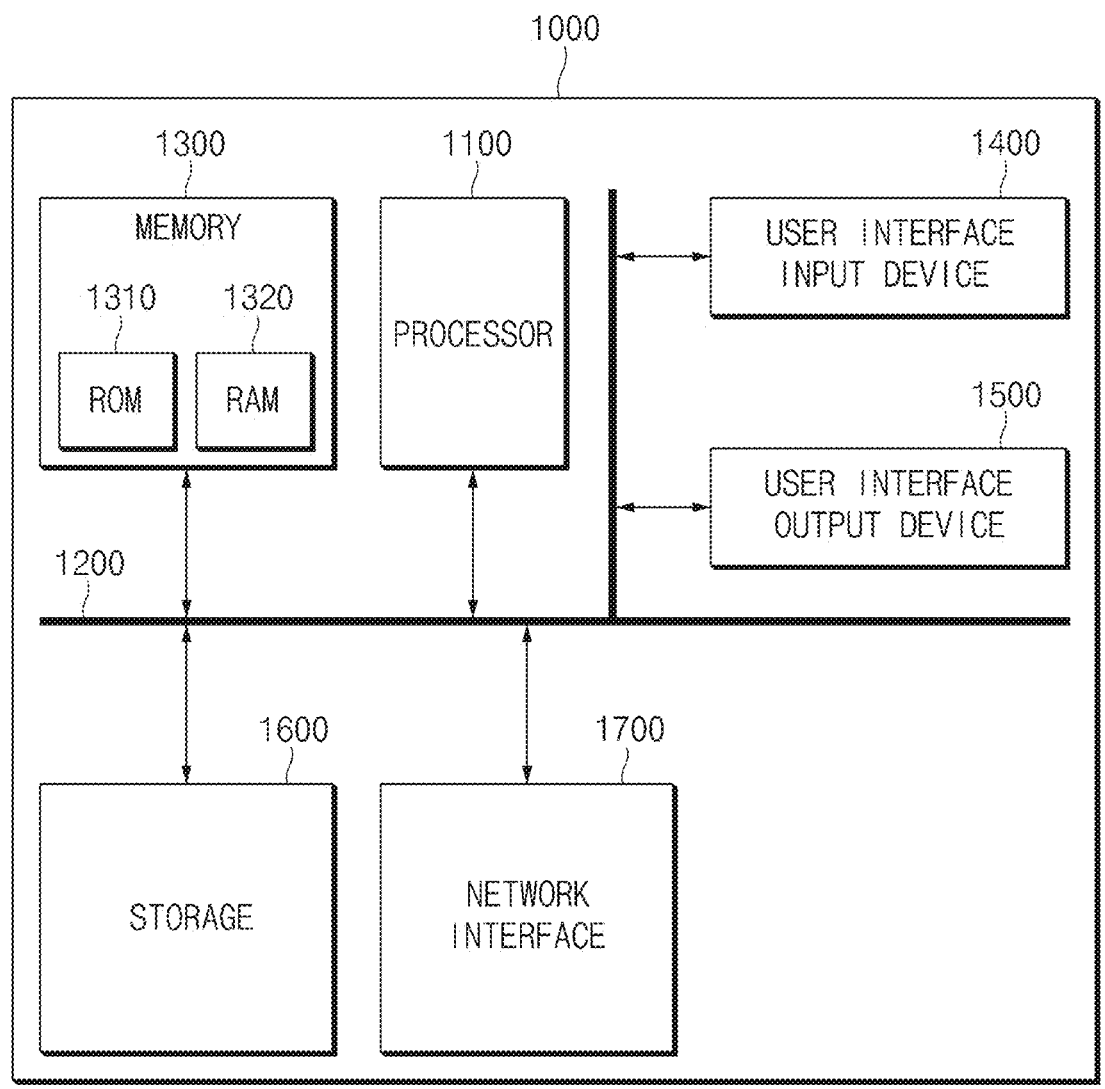
FIG. 5 is a block diagram illustrating a computing system to execute a method for predicting traffic information, according to an embodiment of the present disclosure.

FIG. 5 is a block diagram illustrating a computing system to execute a method for predicting traffic information according to an embodiment of the present disclosure.

Referring to FIG. 5, according to an embodiment of the present disclosure, a method for predicting traffic information may be implemented through a computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus for predicting traffic information and the method for the same, the real-time traffic information with higher accuracy may be predicted by having a model for correcting traffic information for each traffic state in a road section, determining the traffic state in the road section (predicting section) to be predicted, based on K-means clustering algorithm, obtaining a correcting value by using the model for correcting the traffic information corresponding to the traffic state in the road section to be predicted, and correcting the traffic information, based on the obtained correcting value.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

Therefore, the exemplary embodiments of the present disclosure are provided to explain the spirit and scope of the present disclosure, but not to limit them, so that the spirit and scope of the present disclosure is not limited by the embodiments.

What is claimed is:

1. An apparatus for predicting traffic information, the apparatus comprising:
   a storage configured to store a model configured to correct traffic information for each traffic state in a road section;
   a communication device configured to receive real time probe data from a plurality of probe vehicles using global position system (GPS);
   a controller configured to:
      determine a traffic state in a predicting section which is a road section to be predicted based on K-means clustering algorithm;
      obtain a correcting value using a model configured to correct real time traffic information corresponding to the traffic state in the predicting section, wherein the real time traffic information includes a representative speed of the plurality of probe vehicles that pass through the predicting section; and
      correct the real time traffic information in the predicting section based on the traffic state and the obtained correcting value; and
   an output device configured to output the real time traffic information corrected by the controller.

2. The apparatus of claim 1, wherein the controller is configured to:
   classify the traffic state in the predicting section into one of a traffic-stability maintained state, an added congestion state, and a smoothly recovered traffic state by using speeds of the plurality of probe vehicles that pass through the predicting section, and the representative speed in the predicting section.

3. The apparatus of claim 2, wherein in the added congestion state, the controller is configured to:
   decrease the representative speed in the predicting section.

4. The apparatus of claim 2, wherein in the smoothly recovered traffic state, the controller is configured to:
   increase the representative speed in the predicting section; and
   decrease the representative speed in the predicting section for a reference time after increasing the representative speed.

5. The apparatus of claim 2, wherein the controller is configured to:
   calculate the speeds of the plurality of probe vehicles passing through the predicting section based on position information periodically received from the plurality of probe vehicles.

6. The apparatus of claim 2, wherein the controller is configured to:
   calculate, as the representative speed in the predicting section, a mean value of the speeds of the plurality of probe vehicles passing through the predicting section.

7. A method for predicting traffic information, the method comprising:
   receiving, by a communication device, real time probe data from a plurality of probe vehicles using global position system (GPS);
   storing, by a storage, a model configured to correct real time traffic information for each traffic state in a road section;
   determining, by a controller, a traffic state in a predicting section which is a road section to be predicted based on K-means clustering algorithm;
   obtaining, by the controller, a correcting value using a model configured to correct real time traffic information corresponding to the traffic state in the predicting section, wherein the real time traffic information includes a representative speed of a plurality of probe vehicles that pass through the predicting section;
   correcting, by the controller, the real time traffic information in the predicting section based on the traffic state and the obtained correcting value; and
   outputting, by an output device, the real time traffic information corrected by the controller.

8. The method of claim 7, wherein the determining of the traffic state in the predicting section includes:
   classifying the traffic state of the predicting section into one of a traffic-stability maintained state, an added congestion state, and a smoothly recovered traffic state by using speeds of the plurality of probe vehicles that pass through the predicting section, and the representative speed in the predicting section.

9. The method of claim 8, wherein the correcting of the real time traffic information in the predicting section includes:
   in the added congestion state, decreasing the representative speed in the predicting section.

10. The method of claim 8, wherein the correcting the real time traffic information in the predicting section includes:
   in the smoothly recovered traffic state, increasing the representative speed in the predicting section and decreasing the representative speed in the predicting section for a reference time after decreasing the representative speed.

11. The method of claim 8, wherein the determining of the traffic state in the predicting section includes:
   calculating the speeds of the plurality of probe vehicles passing through the predicting section based on position information periodically received from the plurality of probe vehicles.

12. The method of claim 8, wherein the determining of the traffic state in the predicting section includes:
   calculating, as the representative speed in the predicting section, a mean value of the speeds of the plurality of probe vehicles passing through the predicting section.

* * * * *